Figure 1:
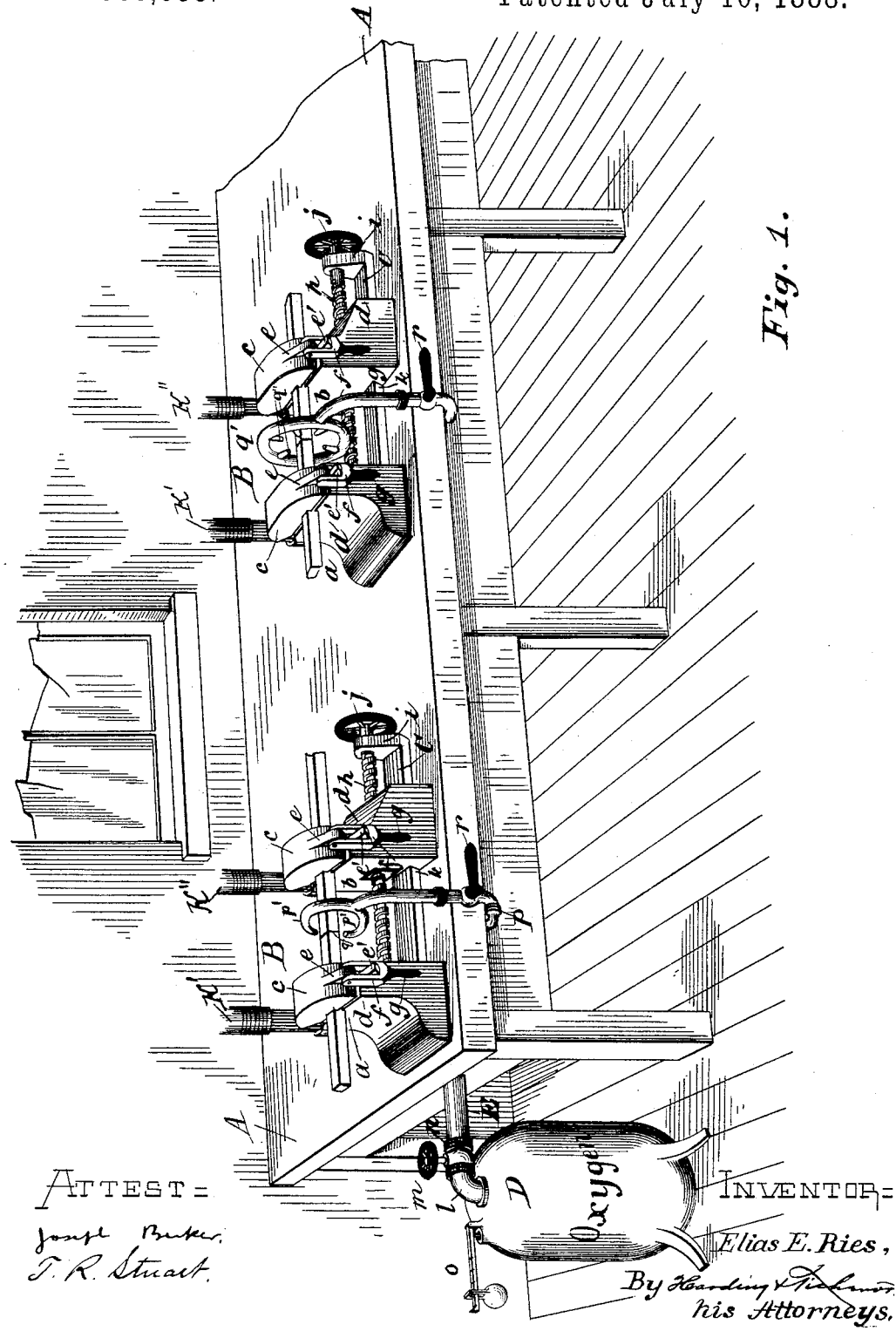

(No Model.)　　　　　　　　　　　　　　　　　　　2 Sheets—Sheet 1.
E. E. RIES.
METHOD OF WELDING BY ELECTRICITY.

No. 386,088.　　　　　　　　　　　　　　Patented July 10, 1888.

ATTEST:
Joseph Baker
T. R. Stuart

INVENTOR:
Elias E. Ries,
By Harding & Fisher
his Attorneys.

(No Model.) 2 Sheets—Sheet 2.
E. E. RIES.
METHOD OF WELDING BY ELECTRICITY.
No. 386,088. Patented July 10, 1888.
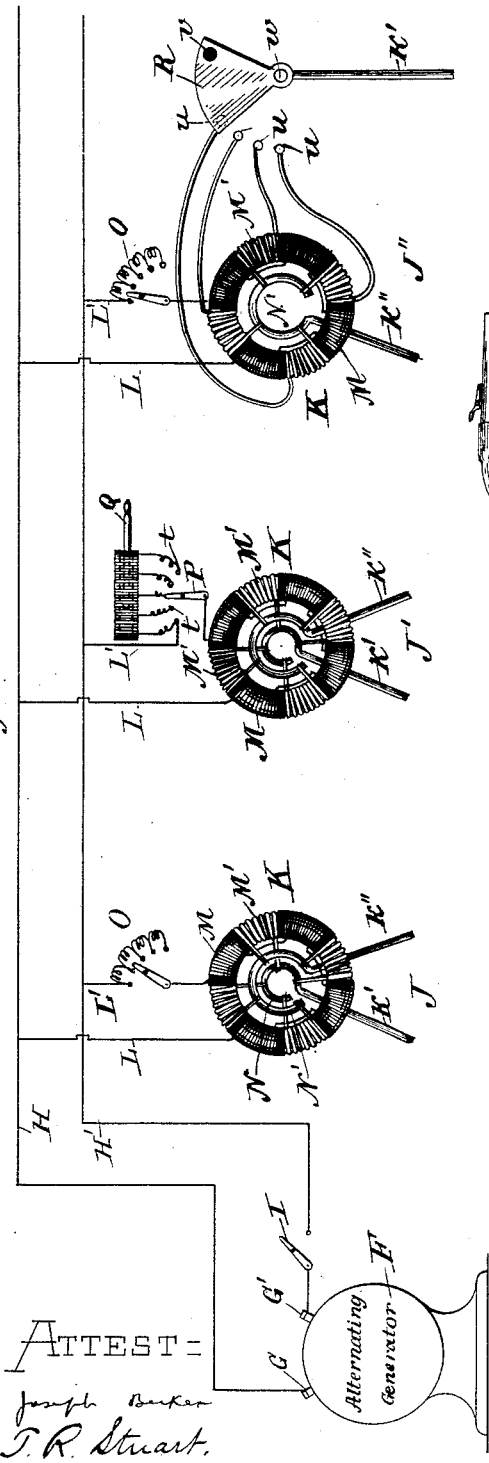
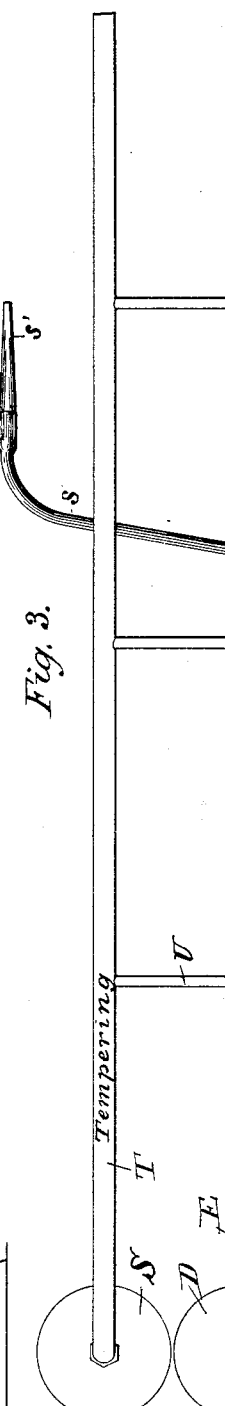
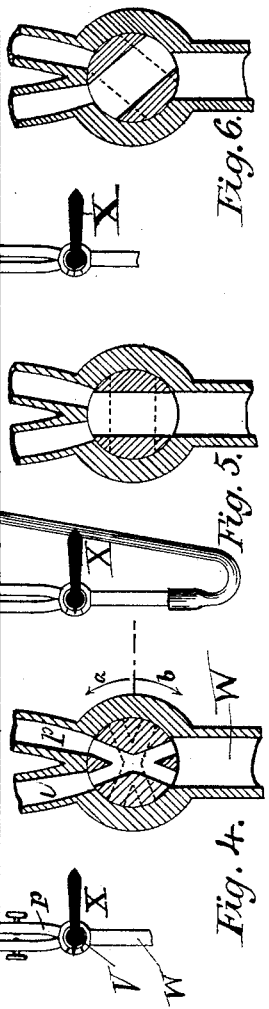
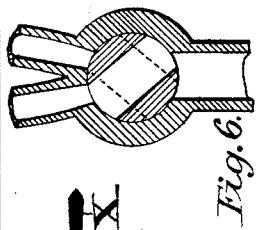

UNITED STATES PATENT OFFICE.

ELIAS E. RIES, OF BALTIMORE, MARYLAND, ASSIGNOR OF ONE-HALF TO ALBERT H. HENDERSON, OF SAME PLACE.

METHOD OF WELDING BY ELECTRICITY.

SPECIFICATION forming part of Letters Patent No. 386,088, dated July 10, 1888.

Application filed March 14, 1888. Serial No. 267,173. (No model.)

*To all whom it may concern:*

Be it known that I, ELIAS E. RIES, a citizen of the United States, residing at Baltimore, in the State of Maryland, have invented certain new and useful Improvements in Methods of Welding Metals; and I do hereby declare the following to be a full, clear, and exact description of the invention, such as will enable others skilled in the art to which it appertains to make and use the same.

My invention relates to a new and improved method or process for effecting welding of joints between pieces of metal in which the fusing or heating effect of both electric currents and oxygen gas is utilized for facilitating the fusion of the joint to be formed between the metals in contact.

I am aware that a process has heretofore been employed wherein the heating agency of electricity was used in welding metallic joints. However, in instances where it is necessary to form welds or unions between metals of very large cross-section having a hardened or tensive structure, I have found that an enormous quantity of current must be converted into the secondary or welding circuit in order to readily obtain the necessary degree of heat at the joint to be welded. Consequently the cost of installation and maintenance of an electric welding-plant for welding joints between steel railroad-rails, large shafts, pipes, and the like, would involve considerable expense and outlay.

Therefore, my invention has for its object to provide an adequate and efficient method of welding, whereby a joint may be formed between any two metals of large cross-section in an expeditions and effective as well as an economical manner.

With this object in view my invention consists, essentially, in first placing the metals in contact under slight pressure; second, passing heating electric currents through the adjacent extremities of the metals in contact, and, third, subjecting the joint when incandescent to the fusing action of oxygen.

My invention consists, further, in combining with the aforesaid salient method other co-operating steps and features, all of which will be clearly described hereinafter, and specifically pointed out in the appended claims.

Referring to the accompanying drawings, Figure 1 is a perspective view showing one mode of carrying out my invention. Fig. 2 is a diagrammatical representation of the welding-circuits, their connections, and source of electricity. Fig. 3 is a diagrammatical view of a modified form of my invention. Figs. 4, 5, and 6 show several modifications of valves employed in conjunction with the apparatus shown in Fig. 3.

Like letters of reference mark similar parts in the several views of the drawings.

Referring to Fig. 1, A represents a work-bench provided with the welding-clamps B B. The welding-clamps B B may be of any approved or necessary construction, since they form no component part of my present invention. However, for the sake of clearness, I will now proceed to describe the construction and operation of the clamps B B. Each clamp B comprises two jaws, $a$ and $b$, each of which latter is formed in two portions, $c$ and $d$, hinged together at the rear and provided with mutual recesses to receive and hold the metals during the welding process. The upper half, $c$, of each clamp-jaw is provided with a laterally-projecting lug, $e$, to which is hinged the bifurcated hasp or catch $f$, having the insulating-handle $g'$, and designed to engage and slip over the corresponding lug, $e'$, of the lower half, $d$. By means of the hasp $f$ and the lug $e'$ the portions $c d$ of each jaw may be opened and fastened at will. The jaw $a$ is fixed in stationary position upon the table A, as shown, while the other jaw, $b$, is capable of a reciprocating movement by means of the longitudinal screw $h$, which bears at one extremity in a recess (not shown) in the jaw $a$, and passes through an insulated screw-threaded longitudinal aperture in the jaw $b$, and is journaled near its other extremity in the upright lug or bracket $i$ of the guiding bed-plate C.

$j$ designates a suitable hand-wheel for manipulating the screw $h$.

The under surface of the jaw $b$ is provided with an undercut dovetailed recess, as shown clearly in Fig. 1, which recess corresponds in dimensions and shape to the contour and size of the bed-plate C, which in turn is provided with inclined or chamfered sides $k\ k$.

The bed-plate C is not in electrical contact with the jaw $a$, nor is the screw $h$, the latter being insulated from both jaws $a$ and $b$ in any suitable or approved manner. Thus it will be readily understood that the metals to be welded can be placed in their respective seats in the jaws $a$ and $b$, the latter fastened by the hasp $f$, and the adjacent extremities of the metals put in contact under pressure by means of the reciprocating jaw $b$ and the screw $h$.

D designates a reservoir, of any approved construction, containing oxygen gas under pressure, and $l$ is a projecting nozzle having the regulating-valve $m$ and provided with a pipe-coupling, $n$, whereby the main oxygen-supply pipe E may be coupled and uncoupled at will.

$o$ represents an ordinary safety-valve for the reservoir D, to preclude the possibility of any casualty or accident.

The supply-pipe E extends longitudinally underneath the work-bench A, and is there supported in any convenient manner.

$p$ designates a curved branch pipe communicating at one extremity with the supply-pipe E, and provided at its other extremity with two open curved branches, $p'\ p'$, forming substantially a C-shaped nozzle. The respective openings of the branches $p'\ p'$ bear at diametrically-opposite points upon the joint $q$, so as to subject both sides of the latter to the jet of oxygen delivered from said branches.

The branch pipe $p$ is provided with a controlling-valve, $r$, for turning on and off the jet of oxygen gas.

Instead of employing the form of nozzle just described, numerous other arrangements can be utilized for equally distributing the flow of oxygen upon the joint—such, for instance, as the form shown at $q'$, Fig. 1, which consists of a continuous ring having a requisite number of inwardly and radially projecting nozzles, $q''$, surrounding the joint $q$.

In practice it may be found desirable to have a flexible connection with the supply-pipe E, so that the operator can direct the jet of oxygen to any desirable portion of the joint. Therefore, to meet this requirement, I have shown in Fig. 3 a flexible pipe, $s$, provided with the nozzle $s'$ and thumb-valve.

It will be obvious that each controlling cock or valve $r$ should be located in convenient proximity to the operator, so that the latter can expeditiously control the flow of oxygen.

The means just described whereby the oxygen may be applied *ad libitum* to the metals in contact is only one of various ways in which the same could be effected. Therefore I do not confine myself to any particular apparatus or manner for conveying the oxygen to the welding-clamps, nor to any particular arrangement for applying the oxygen to the joint.

Referring now to Fig. 2, F designates a dynamo-electric generator, of any approved type, for the production in the main line of alternating currents. G G' designate the terminals of dynamo F, and H H' the outgoing and return conductors of the main-line circuit.

I is a circuit-controller for said main-line circuit.

J J' J'', respectively, designate three stations, each having auxiliary devices, such as shown at J, Fig. 2. At each station J J' J'' is located an inductional transformer, K, having its primary coils of fine wire and its secondary coils of coarser wire. From each transformer K its secondary circuit K' K'' extends to the welding-clamps, while the terminals of its primary circuit are connected in multiple arc with the main circuit by the branch conductors L L'.

In the form shown in Fig. 2 each converter or inductional transformer K K consists of an annulus or endless ring, preferably composed of sheets or laminæ of metal insulated from each other and suitably secured together, forming substantially a closed magnetic circuit.

The primary and secondary coils M M' are disposed around the whole surface of the iron core in alternate segmental sections, as shown. The primary coils M are of fine wire and are electrically connected with each other in series, their two terminals being, as before stated, in circuit with the main line. In the spaces between the primary coils are wound the secondary coils M' M', which are formed of coarse wire wound in multiple arc, as shown, their terminals being severally connected with the segmental conductors N' N, leading to the secondary circuit K' K''. I have shown and described this form of converter for the reason that it is particularly adapted for electric welding purposes, inasmuch as a greater yield of current and more economical conversion are attained by its employment. However, since the style or construction of a transformer is not in any manner essential to my invention, I am at liberty to employ any one of the various forms of inductional transformers for the purpose.

At station J is shown the transformer K, having the terminals of its primary coils severally connected with the main-line circuit by the branches L L', and in the branch L' is located a variable or adjustable resistance-switch O, whereby the resistance of the primary circuit may be regulated at will.

At station J' is shown a somewhat different arrangement than the switch O. In this case the branch L' is formed into a number of generating or counter electro-motive force coils, wound in series, as shown, upon a soft-iron core, and having a number of terminals, $t\ t$, arranged in the arc of a circle. A switch-arm, P, is arranged to severally make contact with said terminals, and thereby cut in more or less of the generating coils in order to increase or diminish the counter electro-motive force generated, and thereby regulate the current flowing to the transformer. The coils are preferably wound upon a bobbin having a movable core, Q, which latter acts as a polar regulator to vary the counter electro-motive force set up in the branch circuit L L' obtained.

At station J'' a switch, O, is interposed in the branch circuit L L'. One set of terminals of the secondary coils M', however, instead of being connected to the segmental conductor N, similar to station J, are brought out to a series of switch terminals, $u\ u$, arranged in the arc of a circle, the other set of terminals of said secondary coils being connected to the conductor N', which leads to the conductor K'' of the secondary or welding circuit.

R designates a pivoted quadrant-shaped switch-arm having the insulated handles $v$, and arranged to bridge one or all the terminals $u\ u$, so as to vary the quantity of current in the secondary circuit. This switch arm is in circuit with conductor K' through its pivot, $w$.

The electrical connections, current-regulators, switches, &c., may be changed according to the requirements of my system without departing from the spirit of my invention.

The operation of my invention will now be readily understood. The adjacent extremities of the metals to be welded being placed in contact, as shown in Fig. 1, the secondary circuit K' K'' is closed by means of a current regulating and controlling switch, such as shown at station J''. Fig. 2. thereby gradually passing and applying the induced alternating current of the welding-circuit through the clamp-jaws $a$ and $b$ to the ends of the metals in contact until the ends of said metals are either subjected to the maximum heating effect of the secondary electric currents, or are thus heated to a glowing or partially-incandescent state. Now, in order to readily raise the adjacent ends of the metals to a fusing temperature, the controlling cock $r$ of the branch pipe $p$ is quickly turned on, thereby subjecting the ends of the metal to the additional heating effect of oxygen gas, which is equally distributed over the joint $q$ by nozzles $p'$ or $q'$. When the combined heating agency of the welding-circuit and that of the oxygen gas is applied to the ends of the metals in contact, such ends will almost instantaneously assume a molten state, and the metals being under slight pressure, as before stated, the union of joint between the adjacent ends will be formed at the time the fusing-point is reached.

Of course it will be understood that in some instances it may be necessary to regulate the flow of the oxygen upon the metals, and also to regulate the combined heating effect of the two agencies, (electric currents and oxygen,) according to the character and cross section of the metals to be welded together.

By subjecting metals—such as iron or steel—to a jet of oxygen gas heat is developed in proportion to the strength and quantity of oxygen administered, and an oxide of iron is formed upon the surface of the metal.

It is a well-known fact that the facility with which steel may be welded to steel diminishes as the metal approximates to cast-iron; or, in other words, the facility in welding pieces of this metal approximates to wrought-iron with respect to the absence of carbon.

It is a theory that steel exposed to the necessary welding heat will be burned or partially oxidized. Therefore the objection naturally arises that the oxygen of the flame unites with the heated metal and forms upon its surface an oxide of iron, and it has been alleged that the surface oxide prevents a proper weld, inasmuch as said product of combustion actively attacks the hot metal. However, I do not entertain the idea that the employment of oxygen gas for ordinary welding purposes will impede the efficient fusion of the metals, as the oxide formed is comparatively small, and need not be considered as an objectionable factor in the welding of metals of large cross-section unless the atmosphere should be impregnated with an unusual amount of moisture, in which event the oxide so formed might be found in a degree detrimental, for the reason that the presence of moisture is necessary for the formation of the said oxide on the surface of the metals. However, to preclude the possibility of the products of combustion which might arise from atmospheric moisture from attacking the metal undergoing the welding process, any suitable substance—such as carbon-dust, silicate of soda, or solution of silica—may be incorporated with the oxygen gas or administered together with the same, whereby the products of combustion are rendered entirely harmless.

After the weld or union has been formed between two pieces of steel or other hardened metal, it will be obvious that the same will be left in an annealed or softened state, and therefore will be comparatively incapable of strength or durability. Furthermore, if the full strength and heating effects of the electric currents and oxygen gas should be suddenly applied to the ends of steel rails they would immediately assume a molten state; but such sudden application would destroy the tempering properties of the rails beyond subsequent restoration or redemption. Consequently, in order to weld together hardened or tempered metals by my process, the heating effect of both agencies should be gradually applied, so that the joint so formed may be afterward restored to its original hardness and temper by any approved tempering process.

In Fig. 3 I have shown a certain arrangement whereby the welded joint may be afterward tempered by means of a cold-air blast, ammonia, or any desirable tempering substance. In this figure, S represents a reservoir containing the tempering fluid or solution under pressure, and T designates the main supply-pipe extending parallel and in close proximity to the oxygen-supply pipe E. A branch pipe, U, extends from the pipe T and joins the oxygen branch pipe $p$ in a two-way cock, V.

W designates a nozzle opening at one extremity opposite the welding-clamps B (see Fig. 1) and communicating at its other end with the two-way cock V.

By reference to Fig. 4 it will be seen that the cock or valve V consists of a central rotatable plug having two egress ports or orifices extending diametrically through the same and adapted to register in unison with the openings in the pipes T p and the nozzle W. To the central plug is attached the handle X for moving the valve-plug to open and close the egress-ports.

In Figs. 5 and 6 are shown a modified form of a two-way valve, in which only one egress-port is provided. In Fig. 5 a central plug is shown in such a position as to allow the contents of both pipes T and p to pass through into the nozzle W, while in Fig. 6 the central plug is so placed as to allow the contents of the pipe p only to pass through the valve, the pipe T being closed by the side of the central plug. Thus it will be seen that by means of the construction shown in Fig. 3 the flow of the oxygen gas and the tempering substance is controlled by a single valve arranged within easy reach and manipulation of the operator, located at the welding-clamps. By this arrangement the joint can be tempered immediately after the welding process has been completed before the joint has had time to become cool.

I do not confine myself to any particular manner of tempering the joint after welding, nor to any particular tempering, hardening, or toughening substance, as the joint may be treated by numerous processes—such as hammering, rolling, dipping, &c.

Having thus fully described my invention, what I claim as new, and desire to secure by Letters Patent of the United States, is—

1. The method of effecting union between two metals in contact, consisting in the application of heating-currents of electricity to traverse the joint to be welded, and simultaneously subjecting said joint to the action of oxygen gas.

2. The method of welding, consisting in the application of heating-currents of electricity to the portions of the metals in contact, gradually increasing the current strength until the desired strength of current traverses the said portions of metal, and simultaneously subjecting the joint to the action of oxygen gas.

3. The method of welding, consisting in the application of heating-currents of electricity to the portions of the metals in contact, assisting the fusion of said portions of metal by subjecting the same to the action of oxygen gas, and treating said portions of metal with a substance for preventing the products of combustion from attacking the metals simultaneously with the administration of oxygen gas.

4. The method of effecting a weld or union between metals in contact, which consists, first, in the application of currents of electricity having a predetermined heating effect to traverse the joint or weld to be formed, and, second, in re-enforcing the heating effect of the said electric currents by subjecting the said joint to the action of oxygen gas.

5. The method of welding together two metals of hardened or tempered structure without destroying their respective retempering properties at the point of union, which consists, first, in passing an electric current of a certain heating effect through the ends of the metals in contact, and gradually increasing the current strength until a certain temperature of the metals is obtained, and, second, in subjecting the said ends of the metals in contact to action of oxygen gas, and gradually increasing the flow of the said gas until the metals are fused and united.

In testimony whereof I affix my signature in presence of two witnesses.

ELIAS E. RIES.

Witnesses:
 LEOPOLD RIES,
 FELIX R. SULLIVAN.